(12) United States Patent
Kurogane

(10) Patent No.: US 6,259,424 B1
(45) Date of Patent: Jul. 10, 2001

(54) DISPLAY MATRIX SUBSTRATE, PRODUCTION METHOD OF THE SAME AND DISPLAY MATRIX CIRCUIT

(75) Inventor: Hideo Kurogane, Zushi (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/261,425

(22) Filed: Mar. 3, 1999

(30) Foreign Application Priority Data

Mar. 4, 1998 (JP) .................................................. 10-069422

(51) Int. Cl.⁷ ........................................................ G09G 3/36
(52) U.S. Cl. ................................ 345/93; 345/87; 345/92; 345/904
(58) Field of Search .................................. 345/90, 92, 93, 345/94, 98, 99, 904, 87, 208, 205

(56) References Cited

U.S. PATENT DOCUMENTS

| | | | |
|---|---|---|---|
| 4,890,097 | * 12/1989 | Yamashita et al. | 345/93 |
| 5,335,102 | * 8/1994 | Kanemori et al. | 345/93 |
| 5,926,246 | * 7/1999 | Tomita et al. | 349/192 |

FOREIGN PATENT DOCUMENTS

| | | |
|---|---|---|
| 57-39422 | 8/1982 | (JP) . |
| 3-200121 | 9/1991 | (JP) . |
| 4-39055 | 6/1992 | (JP) . |
| 7-46181 | 5/1995 | (JP) . |
| 7-78673 | 8/1995 | (JP) . |
| 4-338721 | 11/1996 | (JP) . |
| 9-171195 | 6/1997 | (JP) . |

* cited by examiner

Primary Examiner—Bipin Shalwala
Assistant Examiner—Mansour M. Said
(74) Attorney, Agent, or Firm—Anderson, Kill & Olick, P.C.

(57) ABSTRACT

A display matrix substrate capable of minimizing an adverse effect of a defective switching element developed in the display matrix substrate. On a substrate 10 plural pixel electrodes 2A, 2B are formed in a matrix form. Switching elements 1A, 1B are provided corresponding to the respective plural pixel electrodes 2A, 2B. Voltage is applied to the pixel electrodes 2A, 2B to display an image on the display matrix substrate by successively operating the switching elements. Defective switching element 1A among the plural switching elements is preliminarily detected in a production process. A pixel electrode 2A of the defective switching element 1A is electrically connected to a pixel electrode 2B of a normal switching element 1B adjacent to the defective switching element 1A. Thereby, it is possible to minimize the adverse effect of the defective switching element 1A to a displayed image by making the pixel electrode of the defective switching element 1A operate together with the pixel electrode of the normal switching element 1B adjacent thereto.

7 Claims, 13 Drawing Sheets

Fig. 13(A) Video Sig. (Original)

Fig. 13(B) Converted Video Sig.

DISPLAY MATRIX SUBSTRATE, PRODUCTION METHOD OF THE SAME AND DISPLAY MATRIX CIRCUIT

BACKGROUND OF THE INVENTION

1. Field of the Invention

The present invention relates to an improvement of a display matrix substrate used in a liquid crystal display apparatus for displaying an image, a production method of the display matrix substrate and a display matrix circuit used for the display matrix substrate.

2. Description of the Related Art

Generally, a liquid crystal has a mobility like a liquid while maintaining a certain molecular arrangement like a solid. This molecular arrangement is readily changed responsive to an intensity of an electric field applied thereto. The change of the molecular arrangement brings a change of the optical characteristics of the liquid crystal. As an apparatus employing such a liquid crystal, there is well known a liquid crystal image display apparatus (referred to as liquid crystal display apparatus).

In the liquid crystal display apparatus, the liquid crystal is enclosed between a common electrode and a matrix substrate having pixel electrodes disposed to face the common electrode, wherein the pixel electrodes can be individually controlled. The optical characteristic of the liquid crystal interposed between the respective electrodes and the common electrode is changed responsive to an intensity of electric field applied across the common electrode and each of the corresponding pixel electrodes by selectively applying a data signal to the respective pixel electrodes.

This type of the liquid crystal display apparatus is further classified into two types, a transmission type and a reflection one. The transmission type liquid crystal apparatus has a capability of reducing a production cost of the apparatus because of a simple structure thereof. On the other hand, it has a drawback of less brightness of a displayed image because downsizing a display pane of the apparatus brings an increase of a ratio of an area occupied by switching transistors for selectively driving the pixel electrodes and wirings, resulting in a decrease of a vignetting factor. Thus, the brightness of the displayed image is decreased.

On the other hand, in the reflection type liquid crystal apparatus as disclosed in the Japanese Patent Publication 57-39422 and Japanese Patent Laid-open Publication 4-338721, the switching transistors and the wirings can be provided under reflective pixel electrodes. Thus, it is possible to obtain a bright image without a decrease of the vignetting factor even when the display panel is downsized.

Accordingly, it is suitable for a magnifying projection type liquid crystal display apparatus to employ the reflection type display panel having small dimensions with a high density.

Next, a description is given of the reflection type liquid crystal display apparatus equipped with MOS type transistors a conceivable one of the liquid crystal display apparatuses.

FIG. 17 shows a block diagram of a circuit for operating pixels arranged in a matrix form in a conceivable liquid crystal display apparatus; and FIG. 18 is a sectional view of a unit pixel of a display matrix substrate shown in FIG. 17.

In FIG. 17, a reference character 1 designates a switching element of a MOS transistor. A plurality of the switching elements 1 are vertically and horizontally disposed in matrix on a glass plate or a silicon substrate (not shown). A pixel electrode 2 and a capacitor 3 for storing electric charges, of which one of terminals is commonly used with the pixel electrode 2, are connected to a source 8 or a drain 7 of the switching element 1. In this case the pixel electrode 2 is connected to the source 8. A gate line Xi for selectively supplying a selection signal is connected to a gate electrode 4 of the switching element 1, and a signal line Yj for supplying a video signal is connected to either the drain 7 or the source 8 which is not connected to the pixel electrode 2. To the gate line Xi, the selection signal is applied from an X direction scanning circuit Xscn. And to the signal line Yj, the selection signal is applied from a Y direction scanning circuit Yscn.

To each of the pixel electrodes 2, there is provided a transparent common electrode (referred to as common electrode) 5 so as to face each of the pixel electrodes 2, and a liquid crystal 6 is enclosed between the common electrode 5 and the pixel electrodes 2. Thus, a pixel is formed with every pixel electrode 2.

Upon an operation of the switching element 1, when a selection signal is applied to the gate electrode 4 through the gate line Xi, the switching element 1 of the MOS transistor is turned on. Thus, the video signal passes the switching element 1 through the signal line Yj, and is simultaneously applied to the pixel electrode 2 and the capacitor 3, resulting is that the capacitor 3 is charged.

Here, an electrical potential of the pixel electrode 2 is maintained responsive to an amount of the electric charges stored in the corresponding capacitor 3 even when the selection signal from the gate line Xi becomes zero, i.e., in a non-selection mode.

During this time, the liquid crystal 6 undergoes an electrical potential applied across the pixel electrode 2 and the common electrode 5. Thereby, a light transmittance of the liquid crystal 6 is modulated. Thus, the electric signal (the video signal) can be converted to a modulated optical signal by controlling an intensity of the electrical potential applied across the pixel electrode 2 and the common electrode 5.

Accordingly, an image can be formed by disposing such unit pixels in matrix on a display panel and by vertically and horizontally scanning both the gate signal and the video signal. As a scanning method mentioned above, all the switching elements 1 along the gate line Xi arranged in an X direction are turned on. Thus, the video signal is applied to the pixel electrodes 2, and the capacitors 3 are simultaneously charged thereby. And the following gate lines Xi are successively turned on by being scanned with the gate signal in a Y direction.

Next, the description is given of a structure of the unit pixel, referring to FIG. 18.

The switching element 1 made of the MOS transistor as mentioned above, has the gate electrode 4, the drain 7, and the source 8. The gate electrode 4 is provided on a substrate 10 made of a single crystal silicon through a gate oxide layer 9. The gate electrodes 4 disposed in the X direction are formed as the gate line Xi by using, for instance, polycrystal silicon (FIG. 17). Further, the drain 7 is connected to the signal line Yj extending in the Y direction (FIG. 17).

Next to the source 8, the capacitor 3 for storing the electric charges is formed by causing an insulation layer made of $SiO_2$ to be interposed between the substrate 10 and a capacitor electrode 11, and the capacitor electrode 11 is connected to the source 8. The pixel electrode 2 is formed, for instance, across an insulation layer 13 over the switching element 1 and the capacitor 3. The pixel electrode 2 and the source 8 are electrically connected through a cutout 14 (enclosed by a broken line in FIG. 18) defined in a thickness direction for an electrical connection.

The pixel electrode 2 is made of such a material as aluminum having a high reflectivity for a read light.

A transparent glass plate 16 coated with the transparent common electrode 5 thereon is provided over the surface of the display matrix substrate 15 formed with the various elements mentioned above so that the transparent common electrode 5 faces the surface of the display matrix substrate 15 leaving a little clearance L1 therebetween. On both surfaces of the transparent common electrode 5 and the pixel electrode 2, there are respectively provided alignment layers 17, 18, and the liquid crystal 6 is enclosed between the pixel electrodes 2 and the transparent common electrode 5, resulting in a liquid crystal panel. Thus, the reflection type liquid crystal display apparatus is produced. An incident light 19 coming from an upper direction of the transparent glass plate 16 passes through the liquid crystal 6, and is reflected by the surface of the pixel electrode 2 and outputted as a modulated light beam 20.

Incidentally, in order to obtain an excellent image quality, the apparatus required at least 300 thousand pixels (640×480 pixels) for a monochrome picture, and several thousand million pixels for a color. Thus, it is necessary to form transistors as the switching elements as many as the number of the pixels.

In a present semiconductor production process, a certain amount of the transistors would be inevitably rejected due to forming faults of the transistors when producing the several thousand million transistors.

In a development of a defective transistor in the display matrix substrate, there occurs a defect of a bright spot or a black spot, resulting in a degradation of display quality of the image. Presently, the production cost of the display matrix substrate having several million pixels is already very high. Thus, discarding a whole display matrix substrate containing such defective transistors incurs a further increase of the production cost. For this problem, there are proposed devices for correcting the defective pixels or making them inconspicuous.

As to such defective pixels, it is possible to detect a defective pixel by applying a driving signal and a video signal to the display matrix substrate, and synchronizing a current response of the video signal with the driving signal of the display matrix substrate after the transistors as the switching elements and the matrix lines made of the signal lines and the gate lines are completed.

As examples of correcting the defective pixels or making them inconspicuous, there are various methods as below.

(1) Method for coating a black color on a part of the glass substrate corresponding to defective pixels.

(2) Method for removing a part of the liquid crystal corresponding to the defective pixels by utilizing optical energy or heat energy (Japanese Patent Publication 7-46181).

(3) Method for providing inspection terminals in the substrate and fusing off a part corresponding to the substrate and fusing off a part corresponding to the defective pixels with a laser beam in response to the inspection result (Japanese Patent Publication 7-78673).

(4) Method for fusing off scanning electrodes and signal input terminals of the transistors with a laser beam and connecting the defective pixels to the adjacent pixels with a laser beam (Japanese Patent Publication 4-39055).

However, in the various methods mentioned above, there are drawbacks as follows.

In the case where the defective pixel is coated with the black color as mentioned in the item (1), the black spot appears conspicuous in a bright image though it is not so in a dark image. In the case where the liquid crystal of the defective pixel is removed as mentioned in the item (2), it is difficult to remove the defective pixel when the area of the defective pixel is small. Further, the circumferential pixels of the defective pixel are subject to damage by heating. In the case of the melt-cutting by using the laser beam as mentioned in the items (3) and (4), corresponding pixels are tend to be damaged by heating, and the luminance of the corresponding pixels becomes unstable as their driving transistor fused off are no longer functioning.

SUMMARY OF THE INVENTION

Accordingly, a general object of the present invention is to provide a display matrix substrate, the production method of the display matrix substrate and a display matrix circuit used for the display matrix substrate, where the disadvantages as mentioned in the foregoing have been eliminated.

Another object of the present invention is to provide a display matrix substrate and a production method of the same capable of limiting the adverse effect of the defective switching element to a minimum even when the defective pixel reside in the display matrix substrate.

More specific object of the present invention is to provide a display matrix substrate used for displaying an image, the display matrix substrate comprising a substrate, a plurality of pixel electrodes arranged in a matrix form on the substrate, and a plurality of switching elements arranged corresponding to the plurality of pixel electrodes, wherein the image is displayed by successively driving the plurality of switching elements so as to apply voltages to the plurality of pixel electrodes, the display matrix substrate further comprising: a first pixel electrode provided to a defective switching element preliminarily detected among the plurality of switching elements by driving the plurality of switching elements in a production process, the first pixel electrode electrically connected to a second pixel electrode provided to a normal switching element residing adjacent to the defective switching element in the production process.

Another and more specific object of the present inventing is to provide a display matrix circuit for driving a display matrix substrate comprising a substrate, a plurality of pixel electrodes arranged in a matrix form on the substrate, and a plurality of switching elements arranged corresponding to the plurality of pixel electrodes, the plurality of pixel electrodes containing a first pixel electrode provided to a defective switching element among the plurality of the switching element and a second pixel electrode provided to a normal switching element residing adjacent to the defective switching element, the first pixel electrode being electrically connected to the second pixel electrode, wherein the image is displayed by successively driving the plurality of switching elements so as to apply voltages to the plurality of pixel electrodes, the display matrix circuit comprising: defective-pixel memory means for storing positional information of the defective switching element; temporary memory means for storing a first video signal intended to drive the defective switching element on a basis of the positional information stored in the defective-pixel memory means; and signal conversion means for generating a second video signal to drive the normal switching element on a basis of a third video signal to be originally intended to drive the normal switching element and the first video signal read out from the temporary memory means when the normal switching element is driven.

Other more specific object of the present invention is to provide a display matrix circuit for driving a display matrix substrate comprising a substrate, a plurality of pixel electrodes arranged in a matrix form on the substrate, and a plurality of switching elements arranged corresponding to the plurality of pixel electrodes, the plurality of pixel electrodes containing a first pixel electrode provided to a defective switching element among the plurality of the switching element and a second pixel electrode provided to a normal switching element residing adjacent to the defective switching element, the first pixel electrode being electrically connected to the second pixel electrode, wherein the image is displayed by successively driving the switching elements so as to apply voltages to the plurality of pixel electrode, the display matrix circuit comprising: defective-pixel memory means for storing positional information of the defective switching element; defective-pixel memory means for storing positional information of the defective switching element; temporary memory means for storing a first video signal intended to drive the defective switching element on a basis of the positional information stored in the defective-pixel memory means; status judging means for judging a level state of video signals driving peripheral switching elements arranged adjacent to the defective switching element, and signal conversion means for generating a second video signal to drive the normal switching element on a basis of a result obtained from the status judging means and of a third video signal originally intended to drive the normal switching element and of the first video signal read out from the temporary memory means when the normal switching element is driven.

Other more specific object of the present invention is to provide a production method of a display matrix substrate used for displaying an image, the display matrix substrate comprising a substrate, a plurality of pixel electrodes arranged in a matrix form on the substrate, and a plurality of switchipng elements arranged corresponding to the plurality of pixel electrodes, wherein the image is displayed by successively driving the plurality of switching elements so as to apply voltages to the plurality pixel electrodes, the production method comprising the steps of: a first process for forming the plurality of the switching elements on the substrate, wherein the plurality of the switching elements contains at least a normal switching element and a defective switching element; a second process for detecting the defective switching element prior to forming the plurality of pixel electrodes of the plurality of switching elements; and a third process for electrically connecting a pixel electrode of the normal switching element to a pixel electrode of the defective switching element detected in the second process, wherein a normal switching element resides adjacent to the defective switching element.

Figure 11:
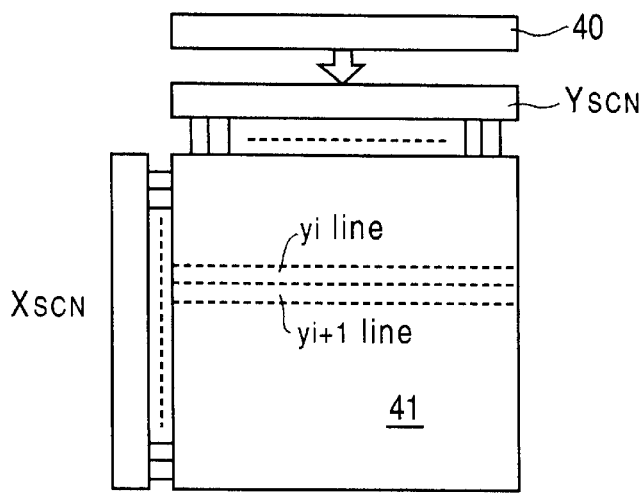
Figure 12:
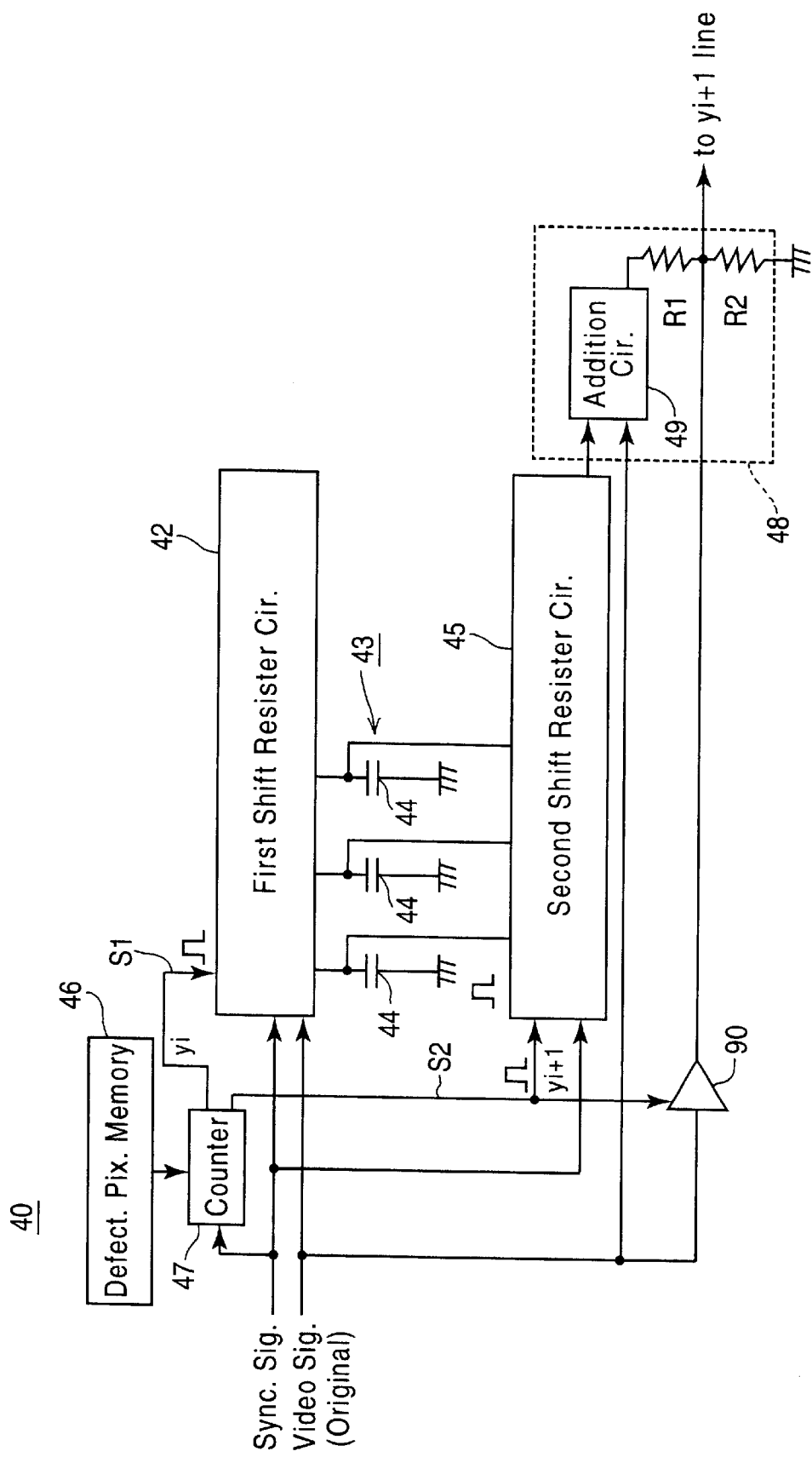
Figure 13:
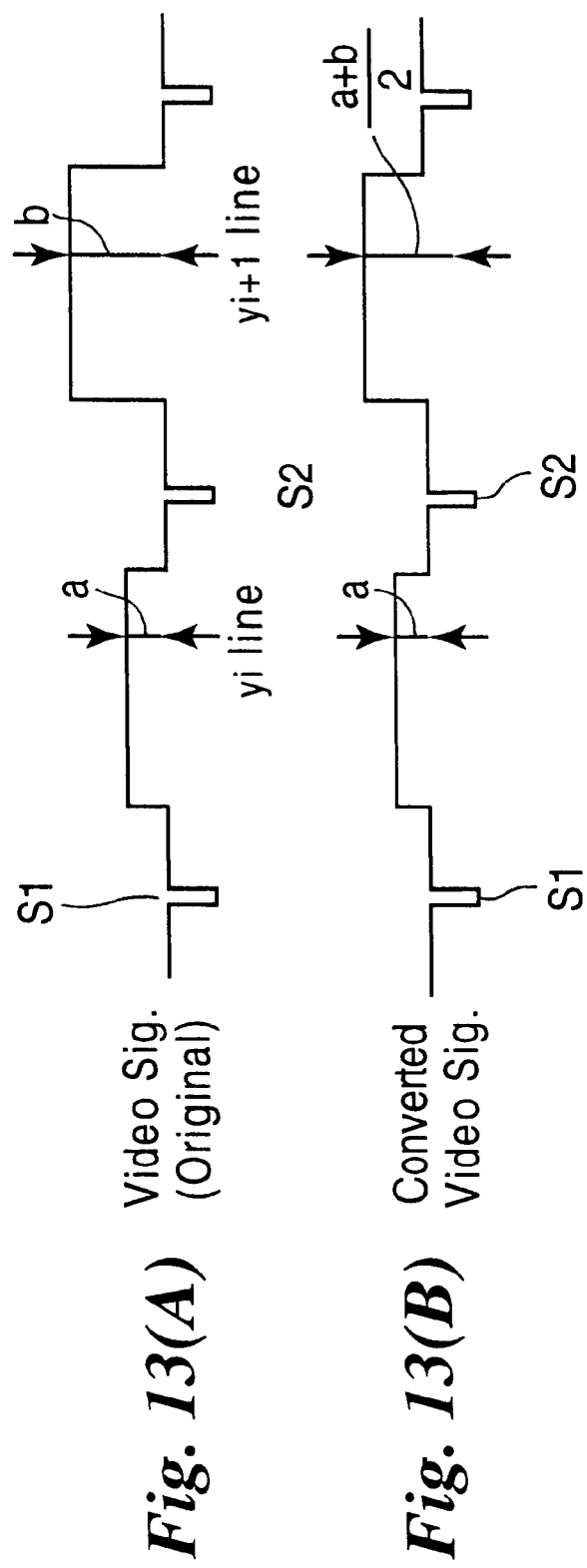
Figure 14:
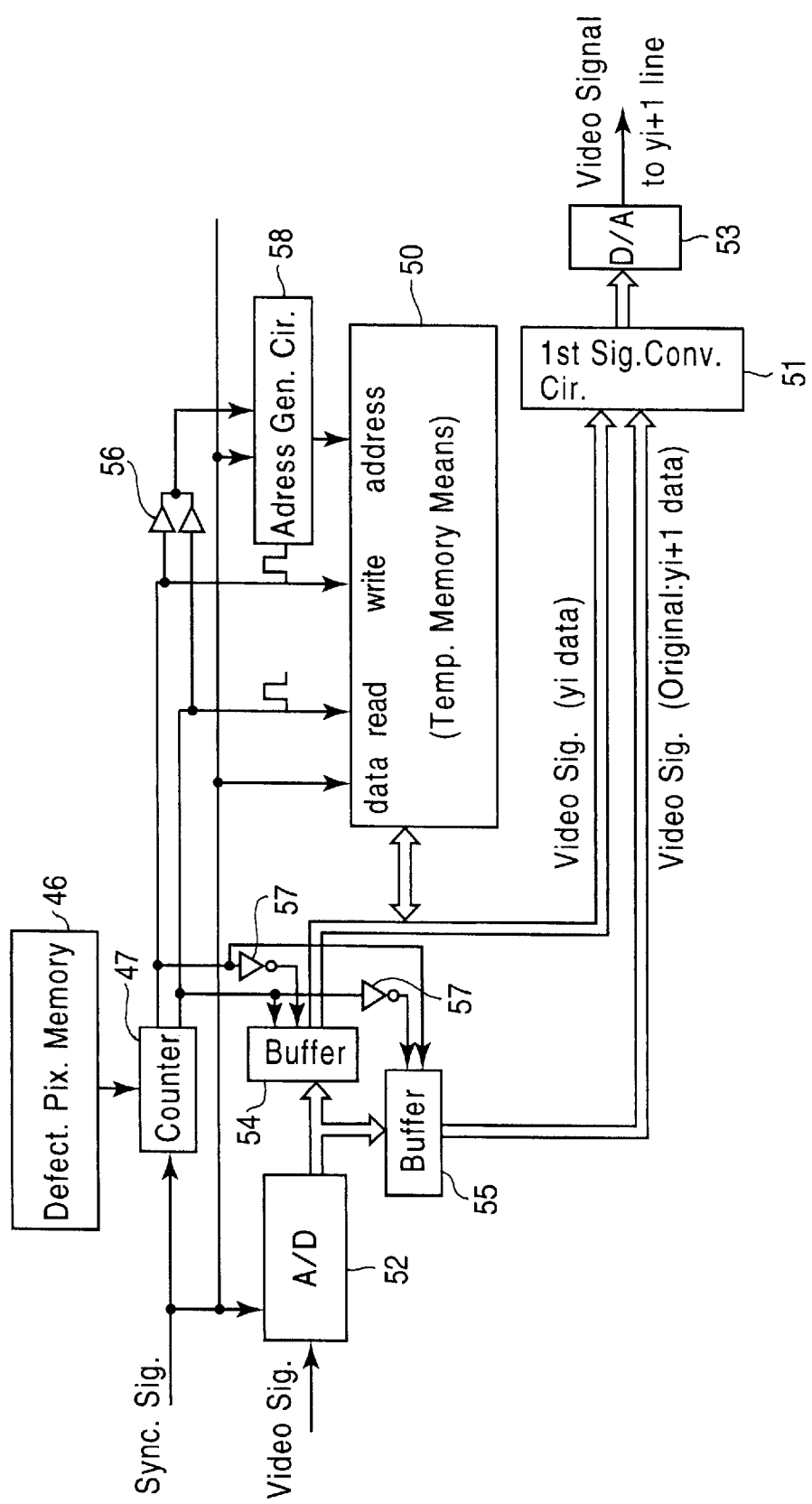
Figure 15:
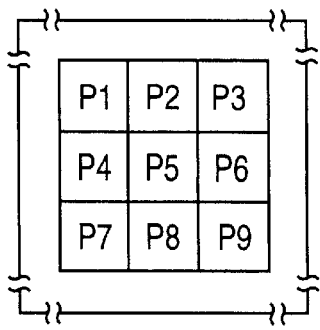
Figure 16:
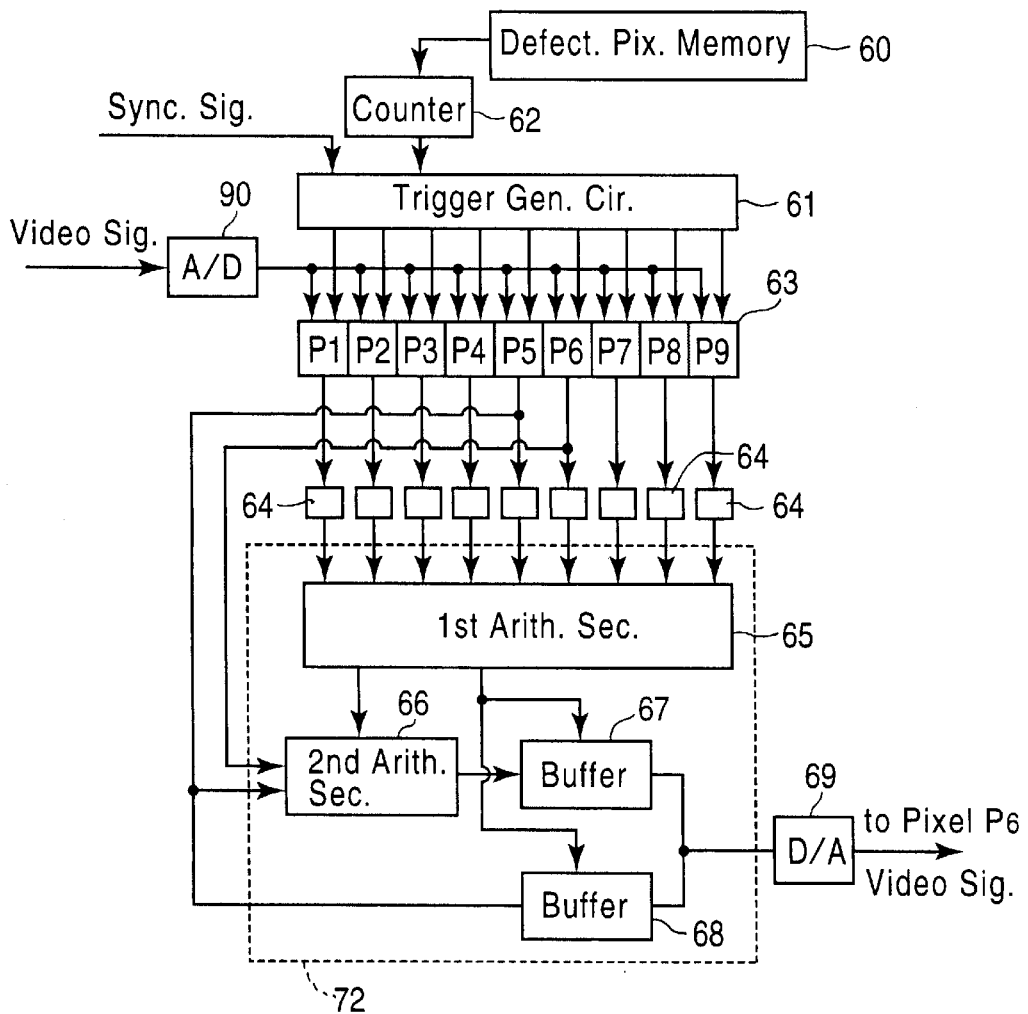
Figure 17:
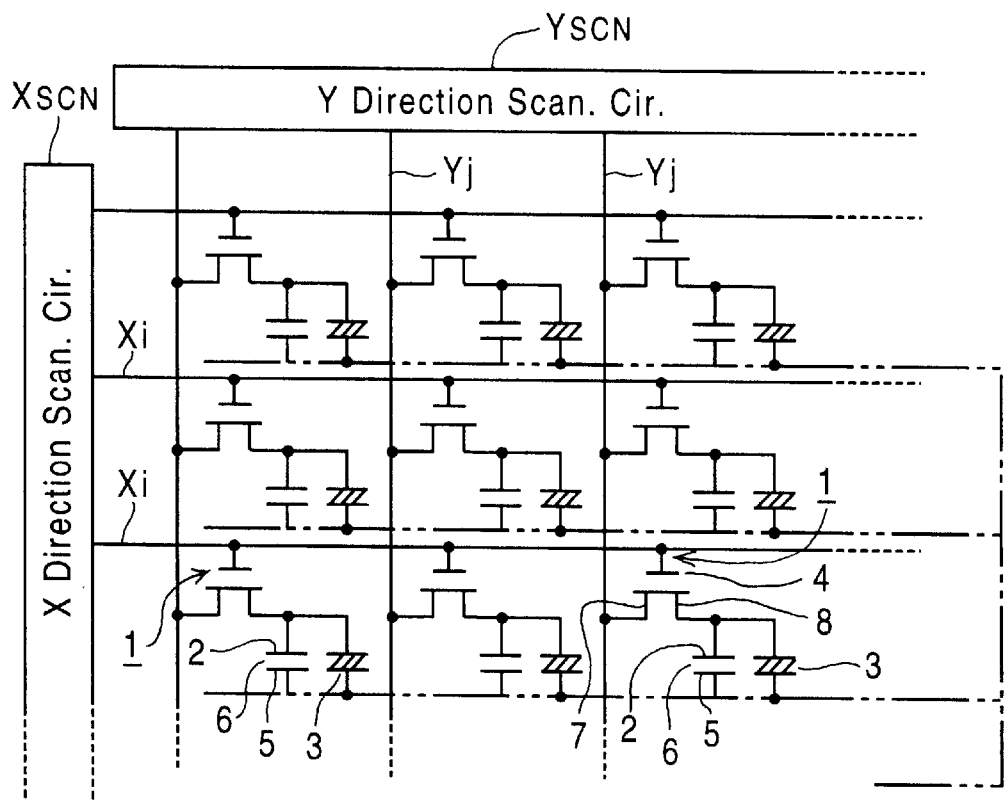
Figure 18:
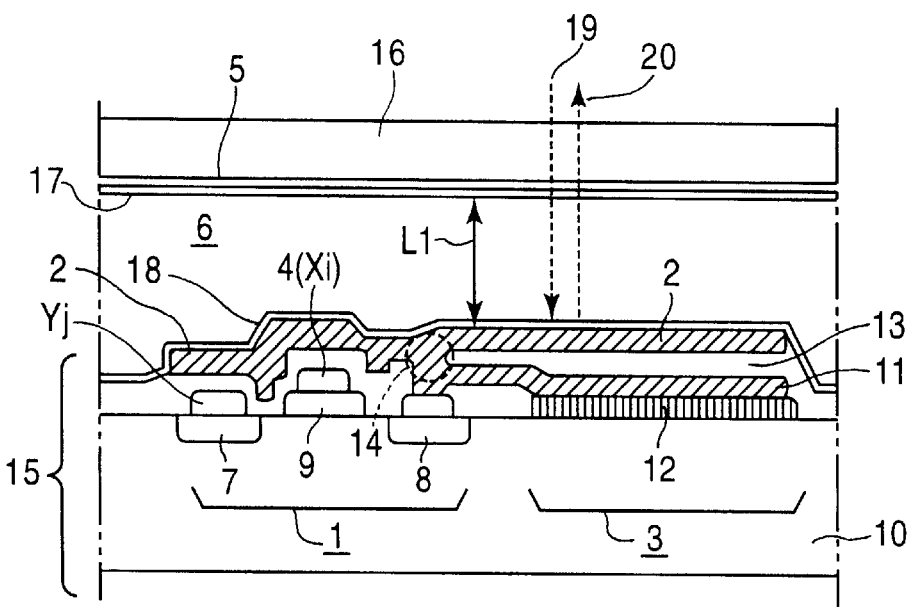

11 is a schematic plan view showing a modified embodiment of the present invention;

FIG. 12 shows a circuit diagram of the modified embodiment shown in FIG. 11;

FIG. 13(A) shows a waveform of an original vide signal;

FIG. 13(B) shows a waveform of a converted video signal;

FIG. 14 is a circuit structure of a third embodiment of the present invention;

FIG. 15 is a schematic plan view showing a state where normal pixels reside around a defective pixel;

FIG. 16 is a block diagram showing a circuit of a variation of the embodiment shown in FIG. 14;

FIG. 17 shows a block diagram of a circuit for driving pixels arranged in a matrix form in a conceivable liquid crystal display apparatus; and FIG. 18 is a sectional view of a unit pixel of a display matrix substrate shown in FIG. 17.

DETAILED DESCRIPTION OF THE PREFERRED EMBODIMENTS

A description is specifically given of an embodiment of a display matrix substrate and a production method of the display matrix substrate, referring to the drawings.

Figure 1:
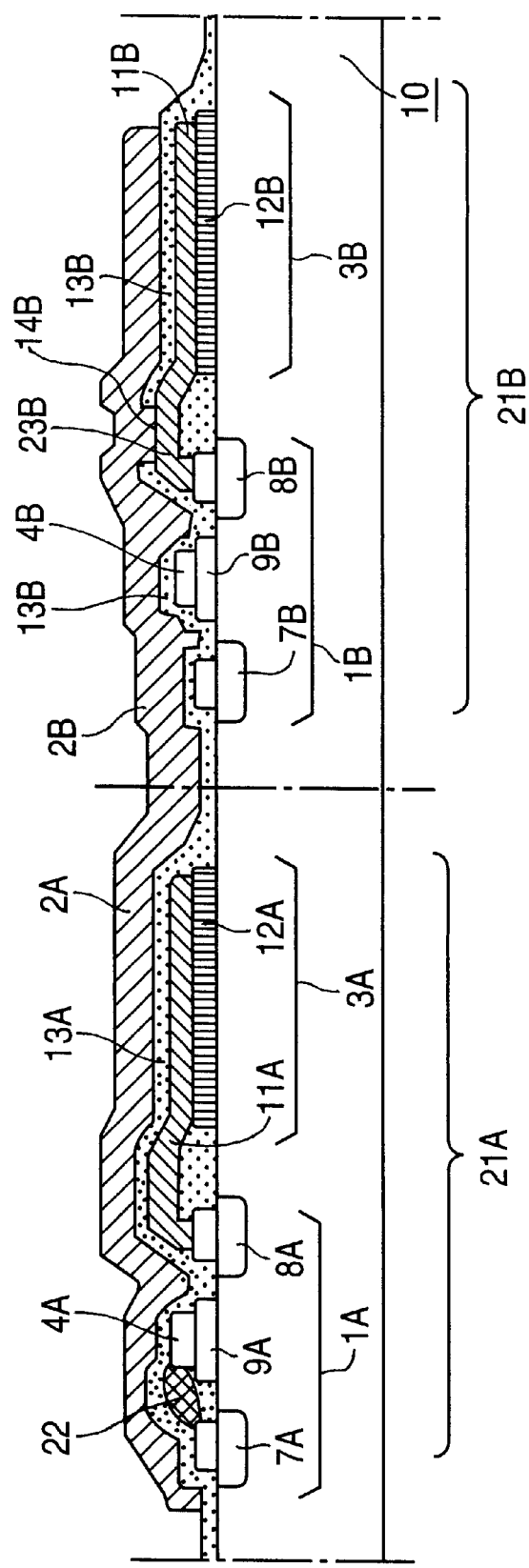
FIG. 1 is a partial sectional view showing two pixels of a display matrix substrate of the present invention.
Figure 5:
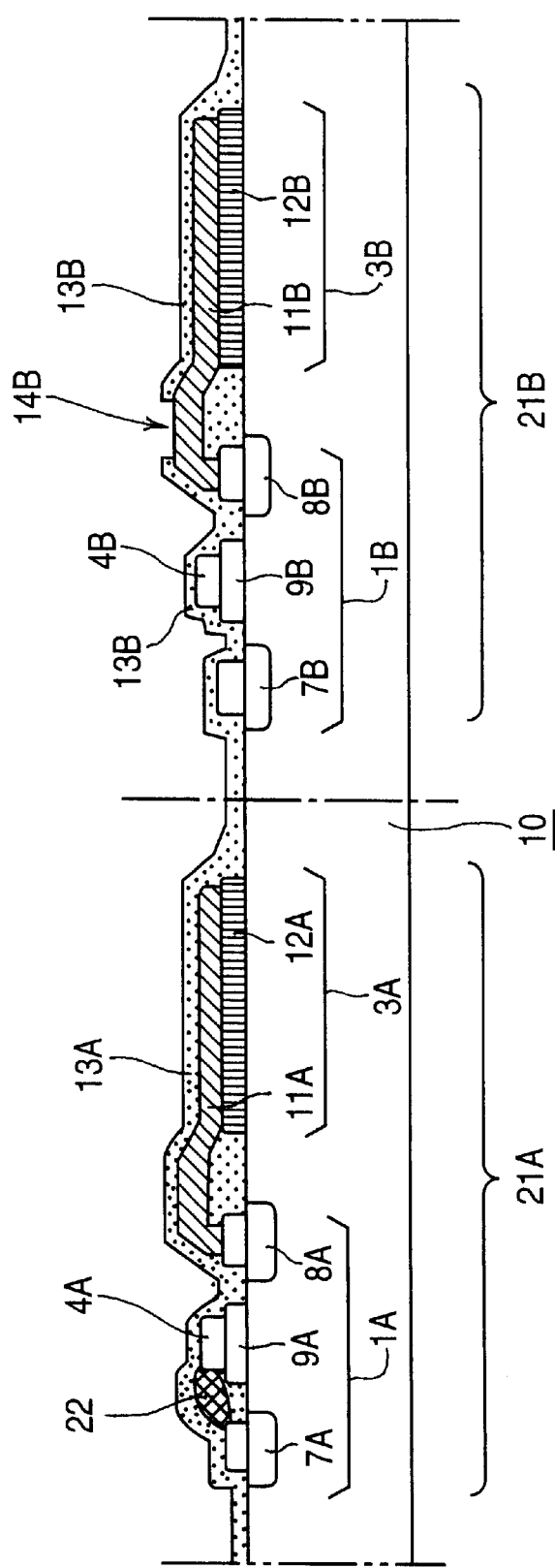
Figure 6:
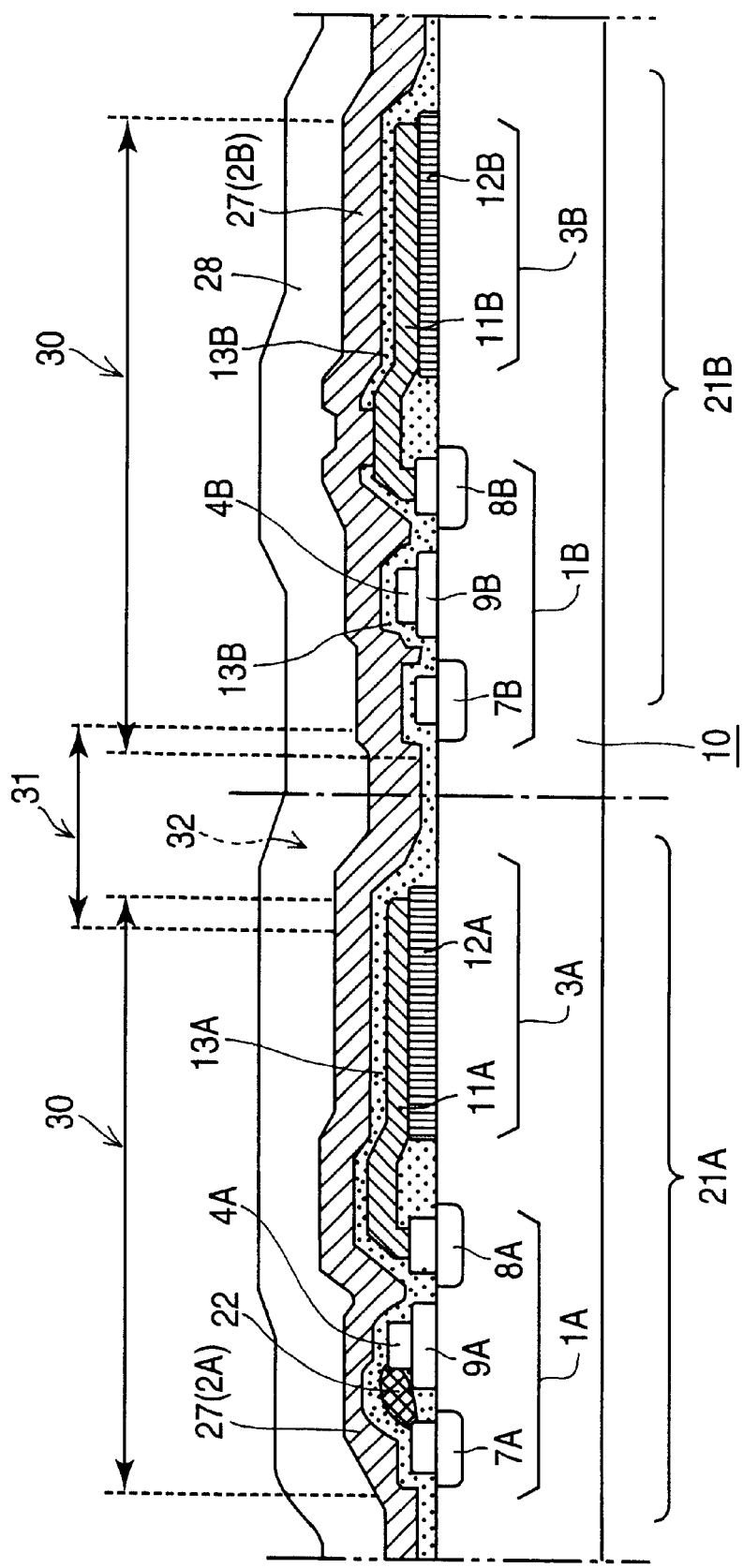
Figure 7:
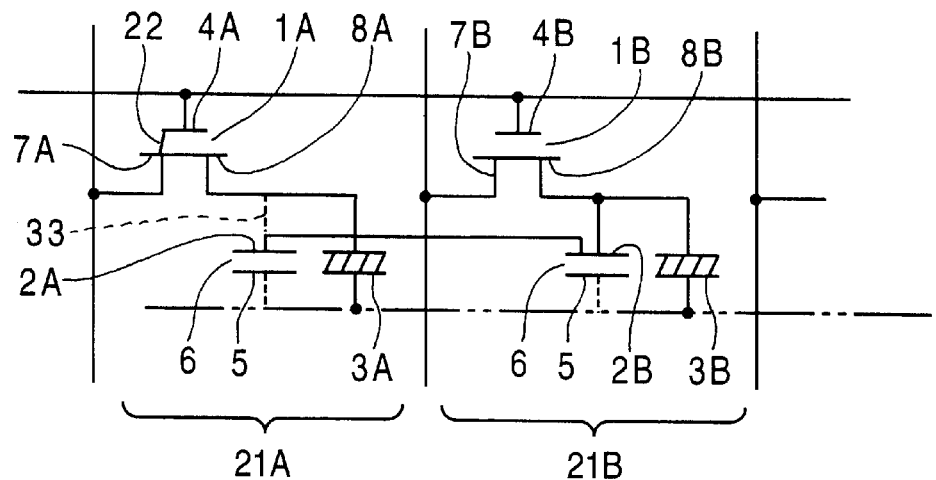
FIG. 7 shows a block diagram of a circuit used for the display matrix substrate shown in FIG. 1.

FIG. 1 is a partial sectional view showing two pixels of a dispaly matrix substrate of the present invention;

FIGS. 2 to 6 are partial sectional views for explaining a production process of the present invention; and FIG. 7 shows a block diagram of a circuit used for the display matrix substrate shown in FIG. 1, wherein like parts are shown with the same reference characters shown in FIGS. 17 and 18.

Here, the description is given of an example of an embodiment where MOS type transistors are fabricated on a silicon substrate as the substrate, however, it is not limited to this embodiment. This invention is applicable to a case where TFTs (thin film transistor) are fabricated on a glass substrate.

Further, in the present invention, it should be noted that an expression of "pixels adjacent to each other" implies that the adjacent pixels have the same color to each other when they are displayed on a display panel. For instance, when a color image is composed of a plurality of color groups such as three color primaries on a display panel, each originally produced by a color filter, the expression "the pixels adjacent to each other" implies that the adjacent pixels belong to the same color group.

First, referring to FIG. 1, a display matrix substrate including defective and normal pixels is explained.

In FIG. 1, the left side exhibits a defective pixel 21A, and the right side exhibits a normal pixel 21B.

The constructive members corresponding to the defective pixel 21A are designated with a suffix A and the constructive members corresponding to the normalpPixel 21B are designated with a suffix B hereinafter.

In the drawings, reference characters 1A, 1B designate switching elements formed on a single crystal silicon substrate 10, respectively. The switching elements (referred to as transistors hereinafter) 1A, 1B are made of MOS transistors. In FIG. 1, reference characters 7A, 7B designate drains of the transistors 1A, 1B, and 8A, 8B source thereof, and 9A, 9B gate oxide layers thereof, and 4A, 4B gate electrodes thereof. Here, in the transistor 1A of the left side, a metallic particle 22 invades between the gate electrode 4A and the drain 7A, resulting in an electrical short circuit therebetween. Thus, the transistor 1A is in a defective state.

Here, reference characters 3A, 3B designate capacitors provided laterally to the respective transistors 1A, 1B for storing electric charges, and 11A, 11B capacitor electrodes of the capacitors 3A, 3B formed laterally. The capacitor electrodes 11A, 11B are electrically connected to the sources 8A, 8B of the transistors 1A, 1B, respectively.

Reference characters 12A, 12B designate insulation layers of $SiO_2$ interposed between the silicon substrate 10 and the respective capacitor electrodes 11A, 11B, and 13A, 13B insulation layers made of $SiO_2$ for covering the transistors 1A, 1B and the capacitors 3A, 3B. Both the insulation layers 13A, 13B are continuously formed. Here, in the insulation layer 13B corresponding to the source 8B of the normal pixel 21B, there is provided a contact hole, namely, a cutout 14B so that the source electrode 23B is exposed, however, it should be noted that there is not provided a cutout in the insulation layers 13A corresponding to the source 8A of the defective pixel 21A.

Reference characters 2A, 2B designate pixel electrodes formed on the insulation layers 13A, 13B. Here, they are not separated electrically as mentioned in the conceivable LCD apparatus but continuously formed, resulting in an electrically connected state. Thus, the source 8B of the normal transistor 1B is electrically connected to both the pixel electrodes 2A, 2B through the source electrode 23B and the cutout 14B.

In other words, the pixel electrode 2A of the defective transistor 1A is electrically connected to the pixel electrode 2B of the adjacent normal transistor 1B. Thus, an operation of the pixel electrode 2A of the defective transistor 1A is controlled by the normal transistor 2B as well as that of the pixel electrode 2B thereof.

Then, as shown in FIG. 18, there is formed an alignment layer 18 on a surface of the display matrix substrate 10 mentioned above and a transparent glass plate 16 having an alignment layer 17 and a common electrode 5 on the alignment layer 18. The liquid crystal 6 is enclosed between the alignment layers 17, 18, resulting in a liquid crystal display device.

The circuit of the display matrix substrate mentioned above is shown in FIG. 7, wherein the pixel electrode 2A of the defective transistor 1A is electrically connected to the pixel electrode 2B of the adjacent normal pixel 21B, not to the source 8A of the defective transistor 1A.

Next, referring to FIGS. 2 to 7 the description is given of the production process of the display matrix substrate.

Figure 2:
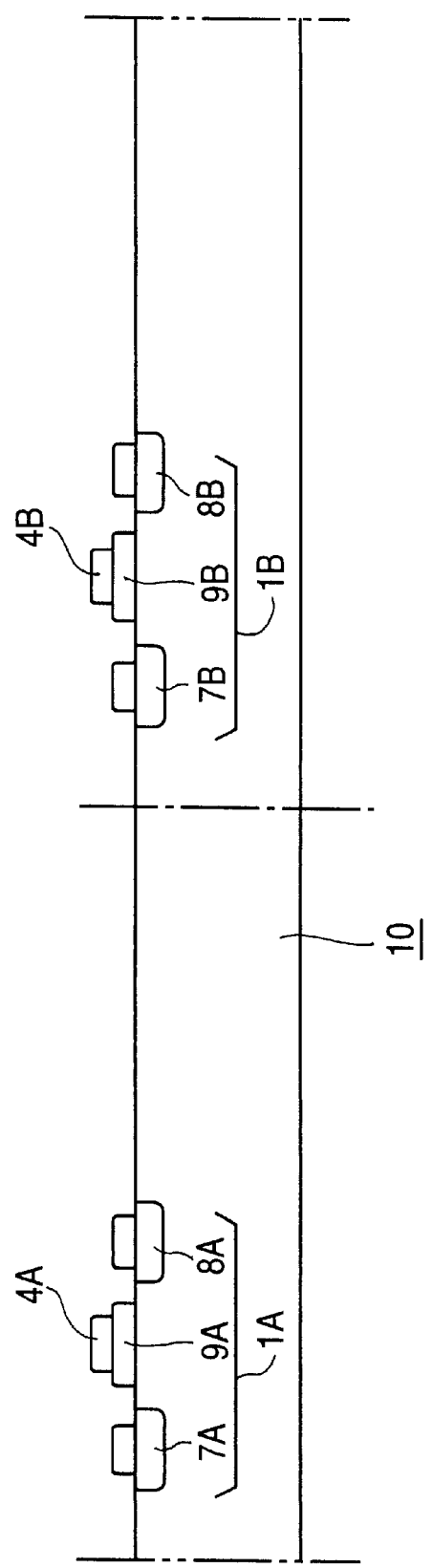
FIGS. 2 to 6 are particle sectional views for explaining a production process of the present invention.

As a first process, on the single crystal silicon substrate 10 there are formed the transistors 1A, 1B of MOS type as shown in FIG. 2. The transistors 1A, 1B are composed of the drains 7A, 7B and the sources 8A, 8B formed at a certain distance by an ion injection method, and the gate electrodes 4A, 4B formed respectively between the drains 7A, 7B and the sources 8A, 8B with the gate oxide layers 9A, 9B therebelow. The gate electrodes 4A, 4B are wired as the gate lines Xi made of, for instance, polycrystal silicon, and the drains 7A, 7B are connected to the signal lines Yj extended in the Y direction as shown in FIG. 18.

Figure 3:
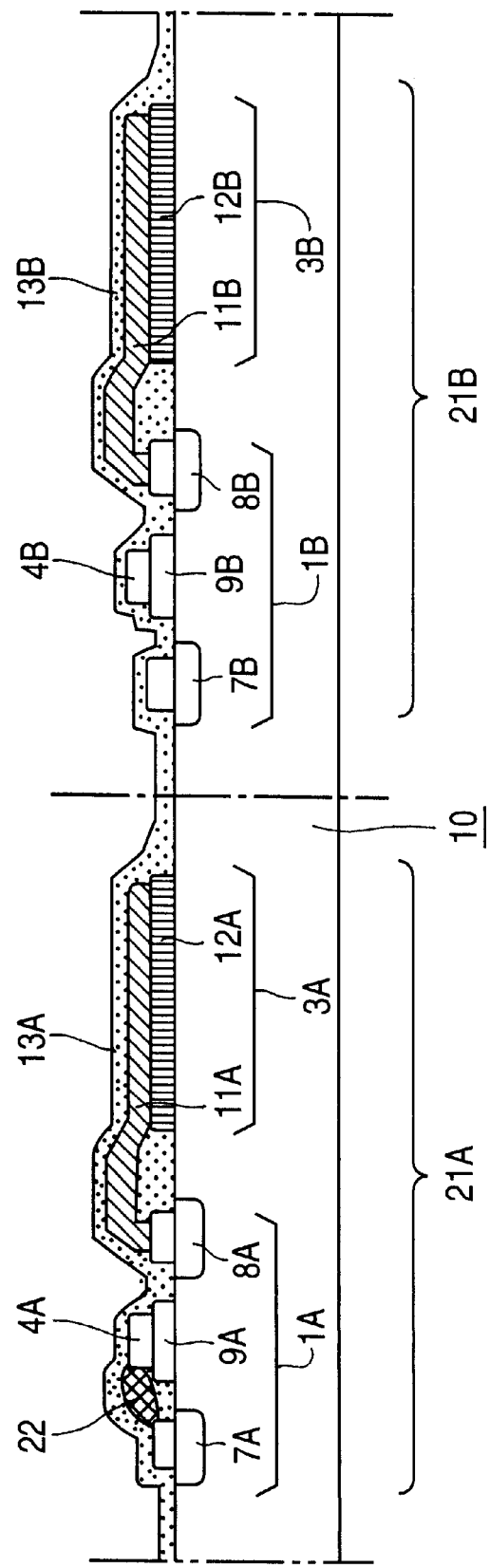

As shown in FIG. 3, the capacitors 3A, 3B for storing the electric charges are provided in such a manner that the insulation layers 12A, 12B are interposed between the surface of the single crystal substrate 10 and the capacitor electrodes 11A, 11B. The capacitor electrodes 11A, 11B are connected to the sources 8A, 8B, respectively. Further, on the transistors 1A, 1B and the capacitors 3A, 3B, there are formed the insulation layers 13A, 13B.

Upon forming the insulation layers 13A, 13B, the metallic particle 22 invades between the gate electrode 4A and the drain 7A causing an electrical short circuit therebetween, resulting in that the transistor 1A is in a defective state.

Further, upon forming the transistors mentioned above, a scanning circuit section for driving the transistors formed in matrix, namely, the X direction scanning circuit Xscn and the Y direction scanning circuit Yscn, is formed around the transistors as well. Thus, the first process is completed.

Next, in a second process, electric signals are applied to the transistor circuit formed in matrix from the X direction scanning circuit Xscn and the Y direction scanning circuit Yscn, resulting that the transistors are operated. Thereby, it is possible to electrically detect the defective transistors by driving the respective transistors.

As inspection methods of the transistors, there are one wherein an evaluation is performed by integrating a charged or discharged current of the capacitor as disclosed in Japanese Patent Laid-open Publication 3-200121, and another wherein a signal having a constant voltage is applied to respective pixels, and the defective transistor is detected from a variation of a current or a voltage passing through or applied to the transistor when the scanning circuits are driven.

In the inspection methods of the transistors mentioned here, any method regardless of a type of a device and a structure thereof can be employed as far as a position of a defective pixel is identified.

Here, as a matter of course, the pixel 21A of the left side containing the metallic particle 22 therein is to be detected as a defective pixel.

Figure 4:
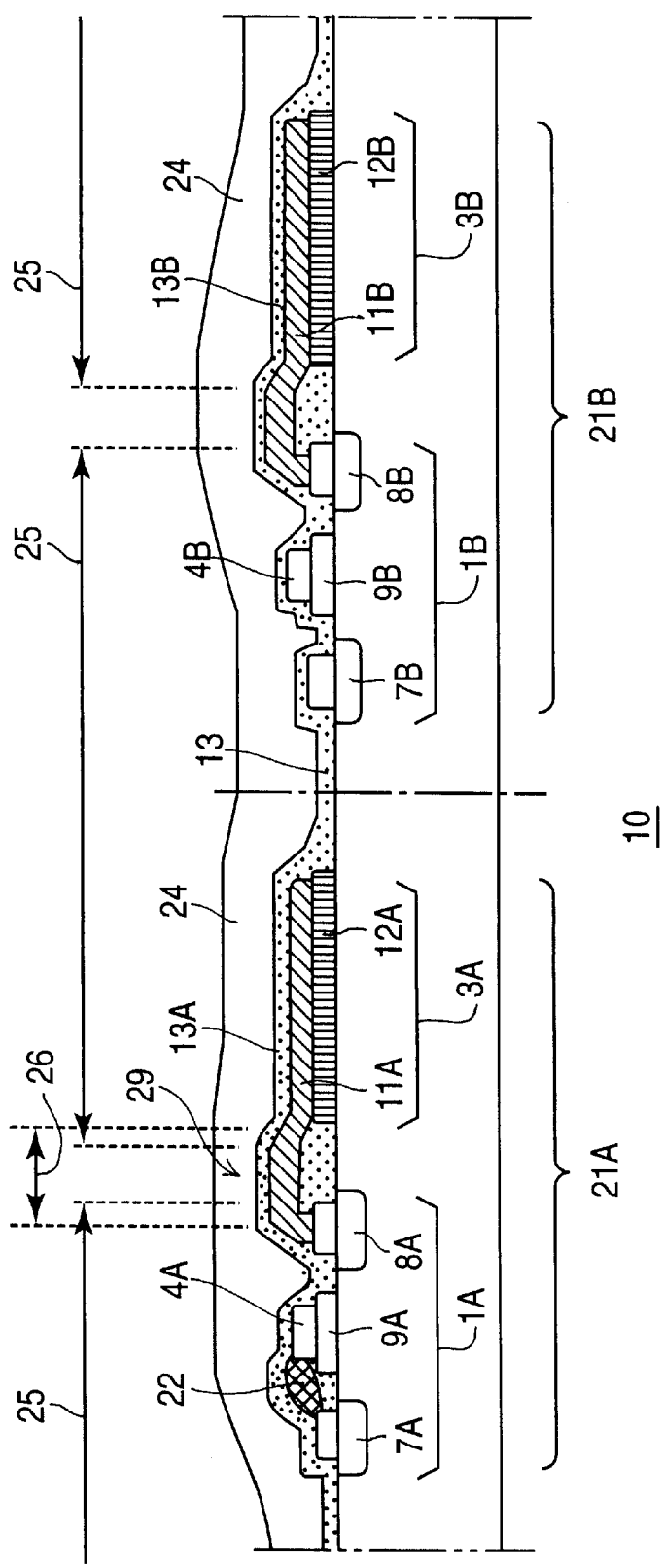

Next, in a third process, as shown in FIGS. 4 and 5, on the basis of information of the defective pixels a contact hole for electrically connecting a pixel electrode, namely, a cutout 14B as shown in FIG. 5 is provided in the insulation layer 13B at a position corresponding to an upper portion of the normal transistor 1B.

Generally, the cutout 14B of the insulation layer 13B is made by a dry etching method employing a resist pattern selectively formed on the insulation layer 13B. In this embodiment, the dry etching method is applicable.

FIG. 4 is a sectional view showing a state where insulation layers 13A, 13B are formed.

As mentioned in the foregoing, the right side exhibits the normal pixel 21B and the left side exhibits the defective pixel 21A. As shown in the left side, a short circuit develops due to the metallic particle 22 interposed between the gate electrode 4A and the drain 7A, resulting in that the pixel 21A is defective.

On the insulation layers 13A, 13B, for instance, a negative-type photoresist 24 is coated, wherein an area thereof irradiated by a light beam is cured so as to remain unremovable in the subsequent etching process. Thus, in order to form the cutout 14B all the negative-type photoresist except for a potion corresponding to the cutout 14B is exposed, resulting in that the resist portion corresponding to the cutout 14B are maintained without being cured.

In this case, a first exposure is performed by using a first mask which is used in a case where all the pixels are supposed to be normal. A first exposure area 25 is shown with double headed arrows. This first exposure area 25 corresponds to all the areas except for all the contact holes, regardless of the defective or the normal pixels.

Next, in order to prevent the cutouts for the defective pixels from being made, a second exposure is performed by using a second mask or a modified mask, with which only a portion corresponding to a cutout of a defective pixel 21A is exposed thus cured.

In FIG. 4, a second exposure area 26 is shown with a double headed arrow 26 above the first exposure area 25. Thereby, it is possible to form a resist pattern preventing a cutout of the defective pixel 21A from being formed. In other words, an area 29 of the negative-type photoresist 24 corresponding to the defective pixel 21A is maintained without being removed in the subsequent etching process.

After that, the cutout 14B is formed on the insulation layer 13B by dry etching, resulting in a state where the cutout 14B is formed on the insulation layer 13B corresponding to the normal pixel 21B. This state is shown in FIG. 5.

Next, the pixel electrodes 2A and 2B are formed.

As shown in FIG. 6, an aluminium layer 27 for forming the pixel electrodes is formed on the whole surface of the insulation layers 13A and 13B by a spatterring method. Then, a negative-type photoresist 28 (the portion irradiated by the light beam is maintained being cured) is coated on the aluminium layer 27, and a negative-type photoresist pattern is formed thereon so that the aluminum to be required is preserved.

First, a third exposure is performed by assuming that all the pixel electrodes are normal. At that time, the exposed area is shown with double headed arrows as a third exposed area 30. Successively, a fourth exposure is performed by exposing a portion interposed between the defective pixel 21A and the normal pixel 21B adjacent thereto again on the basis of obtained information of the defective pixel, resulting in that the pixel electrode 2A of the defective pixel 21A is connected to the pixel electrode 2B of the normal pixel 21B as explained below.

The area exposed by the fourth exposure is shown with a double headed arrow as a fourth exposure area 31. Thereby, the area 32 of the negative-type photoresist 28 is reserved without being removed. As the aluminum layer 27 covered by the cured negative-type photoresist 28 is protected from further etching, the two pixel electrodes 2A, 2B remain continuously each other.

After modifying the negative-type photoresist pattern, the aluminum layer 27 is selectively removed by dry etching, resulting in the display matrix substrate as shown in FIG. 1.

FIG. 7 shows a circuit diagram of this structure. In FIG. 7, the portion shown with broken lines 33 shows an electrically disconnected portion because the cutout for connection is not formed in the insulation layer 13A for the defective transistor 1A as mentioned in the cutout process of the insulation layer 13 referring to FIG. 4. As a result, the defective transistor 1A is not electrically connected to the pixel electrode 2A, and the pixel electrode 2A of the defective pixel 21A is electrically connected to the pixel electrode 2B of the adjacent normal pixel 21B. Thus, it is possible to provide a display matrix substrate having a display quality without developing an adverse effect caused by the defective transistor 1A.

Thereby, it is possible to increase the production yield of the display matrix substrate. This contributes to a reduction of the production cost.

Further, when an amount of the electric charge stored in the capacitor belonging to a single transistor is much larger than an amount of the discharge in the liquid crystal and a path of resistance to the signal line Yi or the gate line Xi from the defective transistor 1A is sufficiently large, in other words, when an off resistance of the defective transistor 1A is sufficiently large, an amount of the discharge becomes small, resulting in that the discharge is limited even when the defective transistor 1A is electrically connected to the corresponding pixel electrode. Thus, in this case there is no problem even when the defective transistor 1A is electrically connected to the corresponding pixel electrode as long as this pixel electrode is electrically connected to the pixel electrode of the adjacent normal transistor.

Thus, in this case, it is possible to skip the modification process of exposing the second exposure area 26 in the cutout process shown in FIG. 4. This contributes to a simplification of the production process and a reduction of the production cost of the display matrix substrate.

This case is represented by the broken line 33 being replaced by a real line in the circuit shown in FIG. 7, which exhibits a state of an electrical connection.

Incidentally, in the embodiment mentioned above, a video signal applied to the pixel electrode 2A of the defective pixel 21A is replaced by a video signal applied to the pixel electrode 2B of the adjacent normal pixel 21B, resulting in that an original video signal to be applied to the pixel electrode 2A of the defective pixel 21A is missing. In this case, a serious problem may not occur when a required resolution is not so high. However, when a high resolution is required for every pixel unit or every pixel line unit, the missing of the video signal can be a problem.

Figure 8A:
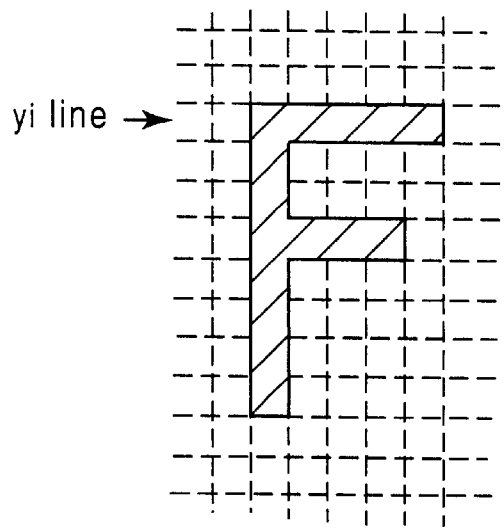
FIG 8(A) is a plan view showing an image displayed on a matrix substrate composed of normal pixels.
Figure 8B:
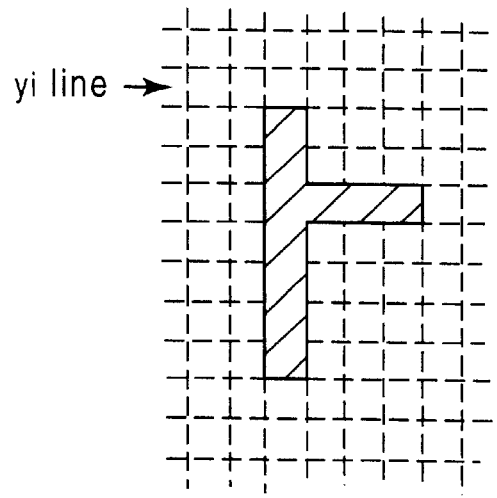
FIG. 8(B) is a plan view showing an image displayed on a matrix substrate having a defective pixel line.
Figure 9:
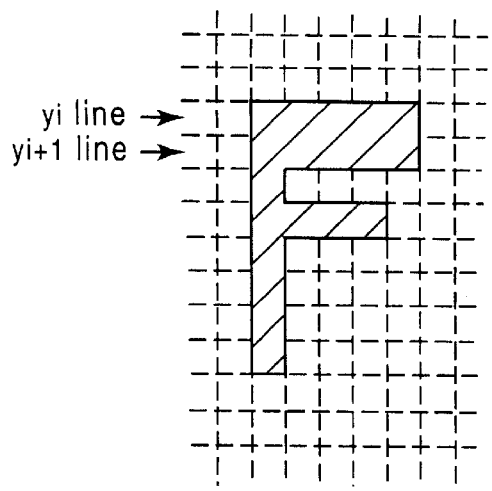
FIG. 9 is a plan view showing an image displayed on a modified matrix substrate, wherein the displayed image shown in FIG. 8(B) is modified by the present invention.

FIG. 8(A) is a plan view showing an image displayed on a matrix substrate composed of normal pixels;

FIG. 8(B) is a plan view showing an image displayed on a matrix substrate having a defective pixel line;

FIG. 9 is a plan view showing an image displayed on a modified matrix substrate, wherein the displayed image shown in FIG. 8(B) is improved by the present invention;

For instance, as shown in FIG. 8(A), an image displayed on the matrix substrate composed of only normal pixels shows an alphabetic letter "F". However, if a whole pixel line yi (lateral direction) is made of the defective pixels, it is impossible to display the letter "F" as shown in FIG. 8(B).

In the present invention, in order to eliminate this problem, the pixel electrodes of the defective pixel line yi shown in FIG. 9 are electrically connected to an adjacent normal pixel line, for instance, the pixel electrodes of a normal pixel line yi+1.

Figure 10A:
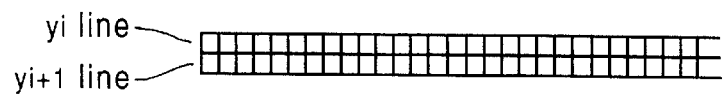
FIGS. 10(A) and 10(B) respectively show a state of the pixel electrode.
Figure 10B:
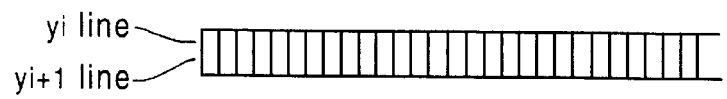

FIGS. 10(A) and 10(B) respectively show a state of the pixel electrode, wherein FIG. 10(A) shows a case where the respective pixel electrodes of the defective pixel line yi and the normal pixel line yi+1 are electrically separated, and FIG. 10(B) shows a case where the respective pixel electrodes of the defective pixel line yi are electrically connected to the adjacent normal pixel line yi+1.

In this case, a video signal applied to the pixel electrodes of the normal pixel line yi+1 includes not only a video signal inherently applied to the normal pixel line yi+1 but also a video signal to be applied to those of the defective pixel line yi. Needless to say, the defective pixel line yi may be connected to another normal pixel line yi−1 instead of the normal pixel line yi+1.

Next, a description is given of a structure to allow the operation mentioned above.

FIG. 11 is a schematic plan view showing a block diagram of a modified embodiment of the present invention; and FIG. 12 shows a circuit diagram of the modified embodiment shown in FIG. 11.

A circuit structure 40 shown in FIG. 12 is provided outside the display surface 41, the Y direction scanning circuit Yscn and the X scanning circuit Xscn. This circuit structure 40 is additionally provided after the inspection of the transistors disposed in matrix has completed. In this exemplary case, the pixel line yi is a defective pixel line and is electrically connected to the adjacent normal pixel line yi+1. Namely, it is possible to display the information of the defective pixel line yi by converting the video signal of the normal pixel line yi+1 to a converged video signal so as to include the video signal of the defective pixel line yi.

Here, the description is given of a conversion device for obtaining the converged video signal by averaging the video signals of both the defective pixel line yi and the normal pixel line yi+1.

The circuit structure of the conversion device has a first shift register circuit 42 for tentatively storing a segment of the video signal corresponding to the pixels of a lateral line by switching the signal successively. To this first shift register circuit 40, there is connected a temporary memory device 43 for storing the video signals of the defective pixel line yi. The temporary memory device 43 is made of a plurality of capacitors 44 for accumulating the electric charges corresponding to the respective pixel electrodes of the defective pixel line yi. Thereby, the video signals are stored as electric charges. The respective capacitors 44 are connected to a second shift register circuit 45 for producing the video signal from the electric charges stored in the capacitors 44.

On the other hand, in defective pixel memory device 46 there are preliminarily stored a first positional information related to the defective pixel line yi on the basis of the inspection results and a second positional information related to the normal pixel line yi+1 to which the defective pixel line yi is connected. A starting timing of the first and second shift register circuits 42, 45 is determined by combining the defective pixel memory device 46 with a counter 47 and monitoring a synchronizing signal of the original video signal, which is inputted to the counter 47.

Further, the output signal from the second shift register circuit 45 is inputted to a first signal conversion device 48. The first signal conversion device 48 has an adding circuit 49 for adding the output signal from the second shift register circuit 45 to the original video signal and dividing resistors R1, R2 connected in series to an output side of the adding circuit 49. An output signal from a connecting point of the resistors R1, R2 is applied to the pixel electrodes of the normal pixel line yi+1. Here, it is possible to obtain a ½ level of the additive signal for the defective pixel and the normal pixel by equalizing a value of the resistor R1 to that of the other resistor R2. The video signal is further applied to the connecting point of the resistors R1, R2 through a buffer 90. The buffer 90 is controlled to be turned off by a start signal S2 (showing yi+1) as a trigger. Thus, the buffer 90 allows to pass through all the signals except for the signal of the normal pixel line Yi+1.

Next, the explanation is given of the operation of the circuit 40, referring to FIG. 12 and FIGS. 13(A), 13(B), wherein FIGS. 13(A), 13(B) are schematic views showing timing charts of the circuit shown in FIG. 12.

First, when the counter 47 identifies an incoming video signal which corresponds to the defective pixel line yi stored in the defective pixel memory device 46 by counting the synchronizing signal of the original video signal, the counter 47 outputs a start signal S1 to start the first register circuit 42. Thus, the first register circuit 42 takes the video signal corresponding to the defective pixel line yi therein. Thereby, the video signals corresponding to the respective pixels are stored in a line of the capacitors 44 as electric charges. Further, video signal segments of all the pixel lines except for the modified pixel line yi+1 passes through the buffer 90 shown in FIG. 12 and are directly supplied to an image display device (not shown) without being processed by the first signal conversion device 48. In other words, the buffer 90 is turned off when the pixel line yi+1 comes in, and turned on (open) when pixel lines other than the pixel line yi+1 come in.

Next, at a starting timing of the video signal of the pixel line yi+1, the counter 47 outputs a start signal S2 to start the second shift register circuit 45, and the second shift register circuit 45 successively reads out the video signal corresponding to the respective pixels from a series of the capacitor 44. The video signals of the defective pixel line yi read out from the capacitors 44 are super-imposed to the original video signal of the normal pixel line yi+1 by the adding circuit 49 of the first signal conversion device 48, and are outputted therefrom. This superimposed signal is outputted as a converted video signal being derived into half level of the added signal by the dividing resistors R1 and R2, and is successively applied to the normal pixel line yi+1.

FIG. 13(A) shows a waveform of an original video signal, and FIG. 13(B) shows a waveform of a converted video signal. When a level of the original video signal of the defective pixel line yi is designated by a reference character "a", and that of the normal pixel line is designated by a reference character "b", a level of the converted video signal becomes (a+b)/2. This converted signal is applied to the normal pixel line yi+1.

Incidentally, the level "a" of the original video signal of the defective pixel line yi just before the level (a+b)/2 is not actually displayed.

As mentioned above, in the embodiment shown in FIG. 12, the converted signal including the video signal of the defective pixel line yi is applied to the adjacent normal pixel line yi+1 without omission of those of the defective pixel line yi, resulting in an increase of resolution of the displayed image. For instance, a content of the displayed image shown in FIG. 8(B) is improved as shown in FIG. 9. Thus, the letter "F" can be recognized as it is.

In the second embodiment shown in FIG. 12, the video signal is handled as an analogue signal, however, it is possible to handle the video signal as a digital signal.

FIG. 14 is a circuit structure of a third embodiment of the present invention, where the video signal is handled as a digital signal.

In the third embodiment, for instance, a temporary memory device 50 comprising a RAM is employed instead of the temporary memory device 43 comprising a series of the capacitor 44 series. Further, as a first digital signal conversion device or circuit 51 for obtaining a converted video signal from the video signal of the defective pixel line and that of the normal pixel line, there is employed an arithmetic circuit.

Further, for inputting the analogue video signal there is provided an A/D converter 52, and for outputting the digital video signal there is provided a D/A converter 53. Further, there are provided buffers 54, 55, 56, an inverter 57, and an address generating circuit 58 in the circuit, wherein a double arrowheaded-parallel-line shows a data bus.

Apart from the differences of the analogue and the digital processing, the operation principle of the circuit is the same as that of the second embodiment shown in FIG. 12.

Specifically, the analogue signal is digitized by the A/D converter 52. The counter 47 counts numbers of the synchronizing signal and compares it with the positional information of the defective pixel line yi. When the video information corresponding to the defective pixel line yi is obtained, the counter 47 outputs a write signal to a write terminal of the temporary memory device 50 and opens the buffer 54, resulting in that the digital video signals are stored in the temporary memory device 50 at respective addresses determined by both the synchronizing signal and a timing pulse generated by the counter 47. Thereby, the video signal of the defective pixel line yi is stored.

Next, when the video signal of the adjacent normal pixel line yi+1 comes, the counter 47 outputs a read signal, and the read signal is inputted to a read terminal of the temporary memory device 50. Thereby, memory contents of respective addresses which are determined by an address generating circuit 58, are successively read out. At that time, the buffer 54 is closed, and the data (line yi) read out is inputted to a first signal conversion circuit 51. At that time, the video signal of the normal pixel line yi+1 A/D converted by the A/D converter 52 is inputted to the first signal conversion device 51 through the buffer 55 opened.

In the first signal conversion device 51, an averaging process is performed by adding the video signal of the defective pixel line yi to that of the normal pixel line yi+1 and dividing the sum by 2. This signal is outputted as a new video signal being converted. This new video signal is converted to an analogue signal by the D/A converter 53, and is inputted to the normal pixel line yi+1.

As mentioned in the foregoing, it is possible to obtain the same effectiveness even when the analogue signal as the video signal is replaced with the digital signal.

In the above embodiment, the description is given of the example where a whole pixel line in a row direction (lateral direction) is defective, however, the present invention can be applied to a case where a whole pixel line in a column direction (vertical direction) is defective.

Further, in the above embodiment, the description is given of an example where a whole pixel line in a row or a column direction is defective, however, the present invention can be applied to a case where one unit pixel is defective.

Incidentally, in the above embodiment, the new video signal is formed by adding the video signal for the defective pixel to the original video signal for the normal pixel to which the defective pixel is connected. Thus, it may be difficult to apply this embodiment to a case where a higher resolution is required for every pixel.

FIG. 15 is a schematic plan view showing a state where normal pixels reside around a defective pixel.

Specifically, as shown in FIG. 15, among nine pixels P1 to P9 arranged at every three pixels in a lateral direction and a vertical direction respectively, a center pixel P5 is supposed to be defective. When luminance differences between a luminance of the pixel P5 and those of the peripheral pixels P1 to P4 and P6 to P9 are small, there is no problem for applying the second or third embodiment to this case by using the new video signal obtained by dividing a level of the sum of the two video signals into a half level as mentioned referring to FIG. 12 or 14.

On the contrary, when the luminance differences between the luminance of the pixel P5 and those of the peripheral pixels P1 to P4 and P6 to P9 are large, for instance, one is a white level and others are a black level, the above-mentioned new video signal may cause a problem because the display of the defective pixel P5 becomes a neutral luminance, i.e., ambiguous gray, resulting in that the resolution is not improved.

In order to improve the problem, a variation of the above embodiment is devised as follows.

First, among the pixels P1 to P9, the center pixel P5 is supposed to be defective and the pixel electrode of the center pixel P5 is supposed to be electrically connected to the pixel electrode of the normal pixel P6 adjacent thereto on the right. Here, when the luminance differences are large, for instance, the center pixel P5 is a white or black level and all the peripheral normal pixels P1 to P5 and P6 to P9 are a black or white level, the normal pixel P6 is given only the original video signal of the center pixel P5. And, the original signal of the normal pixel P6 is neglected. Thereby, it is possible to cause the display of the defective pixel P5 to be conspicuous.

On the other hand, when a middle level video signal middle level other than extreme white or black resides among the peripheral pixels, there the aforementioned new video signal obtained by adding levels of the two video signals and dividing the sum of the levels by 2 can be used.

Usually, a video signal has extensive gradations, for instance, 256 gradations. In this case, the video signal having the gradations may be classified as follows: a black video signal; 0 to 50 gradations, a neutral video signal; 51 to 204 gradations, and a white video signal; 205 to 256 gradations.

Needless to say, it is possible to employ other classifications than that of this embodiment.

FIG. 16 is a block diagram showing a circuit of a variation of the embodiment shown in FIG. 14.

In a defective-pixel memory 60, there are preliminarily stored conditions that the defective pixel is P5, the peripheral normal pixels are P1 to P4 and P6 to P9 and the pixel electrode of the defective pixel P5 is electrically connected to the pixel electrode of the normal pixel P6.

A trigger generation circuit 61 directs a temporary memory 63 to store the video signals by a timing according to a command from a counter 62. The temporary memory 63 has nine cells (shown with reference characters P1 to P9) for storing the video signals corresponding to the above nine pixels P1 through P9 shown in FIG. 15. At the output side of the respective cells (P1 to P9) of the temporary memory 63, a status judgement device 64 for classifying the gradation (luminance) of the video signal into three types, black, neutral and white video levels.

For instance, a second signal conversion device 72 are composed of a first arithmetic section 65 for determining a display mode according to nine signals obtained from the status judgement device 64, a second arithmetic section 66 for generating the new video signal by adding the video signal for the pixel P5 to the video signal for the pixel P6 and dividing the sum by 2, a buffer 67 for receiving the output signals from a second arithmetic section 66 and a buffer 68 for receiving the video signals (original) of the pixel P5.

And, the output signals from both the buffers 67, 68 are supplied to a D/A converter 69. Therefrom, the new video signal is applied to the pixel P6. Incidentally, a reference character 90 designates an A/D converter for converting an input analogue video signal to the digital video signal.

As to the operation of this circuit, when a neutral level video signal is applied to only one pixel among the circumferential eight pixels P1 to P4 and P6 to P9, a mean value of the video signal of the defective pixel P5 and the video signal of the normal pixel P6 is outputted for the normal pixel P6 as a new video signal.

Further, when a black or white video signal is applied to the circumferential eight pixels P1 to P4 and P6 to P9, the video signal (original) of the defective pixel P5 is outputted for the normal pixel P6 as a new video signal.

Specifically, a command signal for driving the trigger generating circuit 61 is outputted from the counter 62 according to data of the defective pixel memory 60. Respective video signals corresponding to the respective pixels P1 to P9 are temporarily stored in the temporary memory 63 by a timing signal outputted from the trigger generating circuit 61.

A degree of the luminance of the respective stored video signals is classified into three levels, i.e., black, white and neutral by the status judgement device 64, and the result signal thereof is inputted to the first arithmetic section 65. The first arithmetic section 65 outputs the new video signal mentioned in the foregoing to the pixel P6 according to the result signal.

More specifically, when the neutral video signal is present in only one pixel among the peripheral pixels P1 to P4 and P6 to P9, the second arithmetic section 66 and the buffer 67 are started. Thereby, the mean value signal obtained by adding the signal of the defective pixel P5 to the signal of the normal pixel P6 and dividing the sum thereof by 2 is inputted to the normal pixel P6 as a new video signal. When all the video signals applied to the peripheral pixels P1 to P4 and P6 to P9 are black or white in level, the buffer 68 is started to output the video signal (original) for the defective pixel P5 to the normal pixel P6 as a new video signal. Thereby, it is possible to avoid a lack of the original video signal for the defective pixel P5, resulting in an improvement of resolution approximately to a degree of a pixel unit.

Further, video signal information of a subsequent pixel line to the line including the defective pixel P5 is unknown at the time when the video signal of the defective pixel P5 has arrived because the video signal of the subsequent pixel line is not received before the arrival of the video signal of the defective pixel P5. Thus, the status judgement of the information of the circumferential pixels P1 to P4 and P6 to P9 is performed by using a video signal information obtained from a corresponding video signal of preceding one frame or one field. The period of one frame or a field is as small as about 30 msec. Thus, a delay of one frame or one field does not cause a serious problem.

As mentioned in the foregoing, according to the display matrix substrate and the production method it has excellent advantages as follows.

The pixel electrode of the defective switching element is connected to the pixel electrode of the normal switching element adjacent to the defective switching element. Thus, it is possible to eliminate the defect of the defective pixel.

Accordingly, even when the defective pixels exist, it is possible to prevent the degradation of the displayed image quality, resulting in a maintenance of a high image display quality. Thereby, the production yield of the display matrix substrate can be improved, resulting in a reduction of a large amount of the production cost.

Further, the modification process of the defective pixels can be performed by the equipment used in the manufacturing process of the display matrix substrate. This saves an extra equipment inspection. In addition, the accuracy of the modification process can be maintained to a degree as high as that in the manufacturing process of the display matrix substrate.

The video signal to be applied to the defective pixel is temporally stored, and upon displaying the normal pixel adjacent to the defective pixel, the first signal conversion device generates a new real video signal including the video signal for the defective pixel. Thus, this prevents a lack of the video signal to be applied to the defective pixel, resulting in an increase of resolution at a unit of one pixel or one pixel line as well as an increase of the production yield of the display panel.

Further, the video signal to be applied to the defective pixel is temporally stored, and upon displaying the normal pixel adjacent to the defective pixel, the second signal conversion device judges the video signal level status of the peripheral normal pixels adjacent to the defective pixel and generates a new real video signal including the video signal for the defective pixel on the basis of the result of the judgement. Thus, this prevents the lack of the video signal to be applied to the defective pixel, resulting in not only an increase of resolution to a degree of one pixel unit but also an improvement of the production yield of the display panel.

What is claimed is:

1. A display matrix substrate used for displaying an image, the display matrix substrate comprising a substrate, a plurality of pixel electrodes arranged in a matrix form on the substrate, and a plurality of switching elements arranged corresponding to the plurality of pixel electrodes, wherein the image is displayed by successively driving the switching elements so as to apply voltages to the plurality of pixel electrodes, the display matrix substrate further comprising:

a first pixel electrode provided to a defective switching element preliminarily detected among the switching elements by driving the switching elements in a production process, the first pixel electrode electrically connected to a second pixel electrode provided to a normal switching element residing adjacent to the defective switching element in the production process.

2. A display matrix circuit for driving a display matrix substrate comprising a substrate, a plurality of pixel electrodes arranged in a matrix form on the substrate, and a plurality of switching elements arranged corresponding to the plurality of pixel electrodes, the plurality of pixel electrodes including a first pixel electrode provided to a defective switching element among the plurality of the switching elements and a second pixel electrode provided to a normal switching element residing adjacent to the defective switching element, the first pixel electrode being electrically connected to the second pixel electrode, wherein the image is displayed by successively driving the plurality of switching elements so as to apply voltages to the plurality of pixel electrodes, the display matrix circuit comprising:

defective-pixel memory means for storing positional information of the defective switching element;

temporary memory means for storing a first video signal intended to drive the defective switching element on a basis of the positional information stored in the defective-pixel memory means; and signal conversion means for generating a second video signal to drive the normal switching element on a basis of a third video signal to be originally intended to drive the normal switching element and the first video signal read out from the temporary memory means when the normal switching element is driven.

3. A display matrix circuit for driving a display matrix substrate comprising a substrate, a plurality of pixel electrodes arranged in a matrix form on the substrate, and a plurality of switching elements arranged corresponding to the plurality of pixel electrodes, the plurality of pixel electrodes including a first pixel electrode provided to a defective switching element among the plurality of the switching elements and a second pixel electrode provided to a normal switching element residing adjacent to the defective switching element, the first pixel electrode being electrically connected to the second pixel electrode, wherein the image is displayed by successively driving the plurality of switching elements so as to apply voltages to the plurality of pixel electrodes, the display matrix circuit comprising:

defective-pixel memory means for storing positional information of the defective switching element;

temporary memory means for storing a first video signal intended to drive the defective switching element on a basis of the positional information stored in the defective-pixel memory means;

status judging means for judging a level state of video signals driving peripheral switching elements arranged adjacent to the defective switching element, and signal conversion means for generating a second video signal to drive the normal switching element on a basis of a result obtained from the status judging means and of a third video signal originally intended to drive the normal switching element and of the first video signal read out from the temporary memory means when the normal switching element is driven.

4. A display matrix circuit as claimed in claim 3, wherein the second video signal is obtained by adding the first video signal to a the third video signal originally intended to drive the normal switching and dividing a sum of the first and third video signals by 2 when the result obtained from the status judging means indicates a neutral level.

5. A display matrix circuit as claimed in claim 3, wherein the first video signal read out from the temporary memory means is arranged to drive the normal switching element when a result from the status judging means indicates other levels than a neutral level.

6. A production method of a display matrix substrate used for displaying an image, the display matrix substrate comprising a substrate, a plurality of pixel electrodes arranged in a matrix form on the substrate, and a plurality of switching elements arranged corresponding to the plurality of pixel electrodes, wherein the image is displayed by successively driving the switching elements so as to apply voltages to the plurality pixel electrodes, the production method comprising the steps of:

a first process for forming the plurality of the switching elements on the substrate, wherein the plurality of switching elements contains at least a normal switching element and a defective switching element;

a second process for detecting the defective switching element prior to forming the plurality of pixel electrodes of the plurality of switching elements; and a third process for electrically connecting a pixel electrode of the normal switching element to a pixel electrode of the defective switching element detected in the second process, wherein the normal switching element resides adjacent to the defective switching element.

7. A production method of a display matrix substrate as claimed in claim 6, wherein the third process further includes;

a fourth process for forming an insulation layer on the plurality of switching elements;

a fifth process for forming an opening on the insulation layer at a position corresponding to the normal switching element;

a sixth process for forming a thin layer of pixel electrode on the insulation layer, and a seventh process for selectively etching the thin layer of pixel electrode so that the pixel electrode of the defective switching element is electrically connected to the pixel electrode of the normal switching element through the opening formed in the fifth process.

* * * * *